US009472925B2

United States Patent
Zende et al.

(10) Patent No.: US 9,472,925 B2
(45) Date of Patent: Oct. 18, 2016

(54) SWITCHGEAR HOUSING INCLUDING A PRESSURE RELIEF MEMBER

(71) Applicant: GENERAL ELECTRIC COMPANY, Schenectady, NY (US)

(72) Inventors: Prashant Sudhakar Zende, Pradesh (IN); Debabrata Mukherjee, Pradesh (IN); Sudhakar Sambaiah Pachunoori, Pradesh (IN); Xuhui Ren, ShangHai (CN); Junjia Shen, ShangHai (CN); Jie Tao, ShangHai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/353,582

(22) PCT Filed: Apr. 26, 2013

(86) PCT No.: PCT/CN2013/074759
§ 371 (c)(1),
(2) Date: Apr. 23, 2014

(87) PCT Pub. No.: WO2014/172886
PCT Pub. Date: Oct. 30, 2014

(65) Prior Publication Data
US 2016/0043532 A1 Feb. 11, 2016

(51) Int. Cl.
*H02B 13/025* (2006.01)
*H02B 1/56* (2006.01)

(52) U.S. Cl.
CPC ............. *H02B 13/025* (2013.01); *H02B 1/565* (2013.01)

(58) Field of Classification Search
CPC .................................................. H02B 13/025
See application file for complete search history.

(56) References Cited

U.S. PATENT DOCUMENTS

| 2,237,367 A | * | 4/1941 | Scott, Jr. | H02B 11/133 200/50.23 |
| 2,258,150 A | * | 10/1941 | Scott, Jr. | H02B 11/133 200/293 |
| 5,574,624 A | | 11/1996 | Rennie et al. | |
| 5,689,097 A | * | 11/1997 | Aufermann | H02B 13/025 218/157 |

(Continued)

FOREIGN PATENT DOCUMENTS

| CN | 2648653 Y | 10/2004 |
| CN | 101291045 A | 10/2008 |

(Continued)

OTHER PUBLICATIONS

Unofficial translation of Chinese Office Action and Search Report issued from corresponding CN Application No. 201380003646.9 dated Aug. 28, 2015.

(Continued)

*Primary Examiner* — Robert J Hoffberg
(74) *Attorney, Agent, or Firm* — Stephen G. Midgley; Global Patent Operation

(57) ABSTRACT

A switchgear housing includes a busbar portion having a busbar enclosure. A first circuit breaker portion is coupled to the busbar portion. The first circuit breaker portion includes a first circuit breaker enclosure. A second circuit breaker portion includes a second circuit breaker enclosure. A first pressure relief member is arranged in the busbar portion. The first pressure relief member is configured and disposed to guide gases associated with an arcing event from the busbar portion upward through the busbar portion.

20 Claims, 4 Drawing Sheets

(56) References Cited

U.S. PATENT DOCUMENTS

| | | | |
|---|---|---|---|
| 5,710,402 A * | 1/1998 | Karnbach | H02B 13/025 218/157 |
| 5,892,195 A | 4/1999 | Aufermann et al. | |
| 6,407,331 B1 | 6/2002 | Smith et al. | |
| 6,417,443 B1 | 7/2002 | Smith | |
| 6,827,643 B2 * | 12/2004 | Eiselt | H02B 1/56 174/17 VA |
| 7,054,143 B2 | 5/2006 | Eiselt et al. | |
| 7,095,606 B2 * | 8/2006 | Mahn | H02B 13/025 220/89.1 |
| 7,821,774 B2 * | 10/2010 | Josten | H02B 13/025 174/17 VA |
| 7,952,857 B1 | 5/2011 | Motley et al. | |
| 7,974,078 B2 * | 7/2011 | Coomer | H02B 13/025 312/236 |
| 8,101,881 B2 | 1/2012 | Miller et al. | |
| 8,242,395 B2 | 8/2012 | Josten et al. | |
| 8,375,566 B2 * | 2/2013 | Ballard | H01F 27/02 174/170 |
| 8,456,838 B2 * | 6/2013 | Ballard | H01F 27/02 361/676 |
| 8,733,855 B2 * | 5/2014 | Josten | H02B 13/025 174/50 |
| 8,842,421 B2 * | 9/2014 | Gingrich | H01H 33/53 174/17 VA |
| 9,214,271 B2 * | 12/2015 | Ballard | H01F 27/02 |
| 2005/0257439 A1 * | 11/2005 | Sarver | E04H 5/04 52/79.1 |
| 2012/0028559 A1 * | 2/2012 | Kingston | H05K 5/0213 454/184 |
| 2016/0035518 A1 * | 2/2016 | Pawar | F24F 7/00 218/157 |
| 2016/0042896 A1 * | 2/2016 | Kingston | H01H 33/53 218/157 |

FOREIGN PATENT DOCUMENTS

| | | |
|---|---|---|
| CN | 101728779 A | 6/2010 |
| CN | 201590606 U | 9/2010 |
| CN | 201663362 U | 12/2010 |
| CN | 201682202 U | 12/2010 |
| CN | 201927930 U | 8/2011 |
| CN | 201975686 U | 9/2011 |
| CN | 202009188 U | 10/2011 |
| CN | 202210647 U | 5/2012 |
| CN | 203367793 U | 12/2013 |
| DE | 29622654 U1 | 5/1997 |
| JP | 2000-228803 A | 8/2000 |
| WO | 02075884 A1 | 9/2002 |
| WO | 2008087120 A1 | 7/2008 |
| WO | 2011045042 A1 | 4/2011 |

OTHER PUBLICATIONS

"Arc-Resistant Low Voltage Switchgear", Eaton, pp. 1-2, Feb. 2010.
"Vacclad-W 38 Kv Arc-Resistant Switchgear Indoor Housings", Eaton, pp. 1-28, Dec. 2010.
International Search Report and Written Opinion dated Feb. 13, 2014 which was issued in connection with PCT Patent Application No. PCT/CN2013/074759 which was filed on Apr. 26, 2013.

* cited by examiner

SWITCHGEAR HOUSING INCLUDING A PRESSURE RELIEF MEMBER

BACKGROUND OF THE INVENTION

The subject matter disclosed herein relates to the art of switchgears and, more particularly, to a switchgear housing including a pressure relief member.

In general, a switchgear serves as an interface between an electrical supply and an electrical load. The switchgear includes a line or busbar portion and a load or circuit breaker portion. The busbar portion includes one or more busbars that are connected to the electrical supply. The circuit breaker portion includes one or more circuit breakers that are electrically connected to the one or more busbars and an electrical load. The circuit breaker is configured to interrupt a flow of current from the one or more busbars to the electrical load in the event of an over-current condition, short circuit condition and/or and over/under voltage condition. The interruption of electrical current provides protection for conductors electrically connecting the circuit breaker and the electrical load.

BRIEF DESCRIPTION OF THE INVENTION

According to one exemplary embodiment, a switchgear housing includes a busbar portion including a busbar enclosure. A first circuit breaker portion is coupled to the busbar portion. The first circuit breaker portion includes a first circuit breaker enclosure. A second circuit breaker portion includes a second circuit breaker enclosure. A first pressure relief member is arranged in the busbar portion. The first pressure relief member is configured and disposed to guide gases associated with an arcing event from the busbar portion upward through the busbar portion.

According to another aspect of the exemplary embodiment, a method of relieving pressure generated by an arcing event in a switchgear housing includes closing an inlet to a busbar portion of the switch gear housing in response to gases produced from an arcing event acting upon a first pressure relief member, and delivering the gases to an outlet provided in a downstream wall of the switchgear housing.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
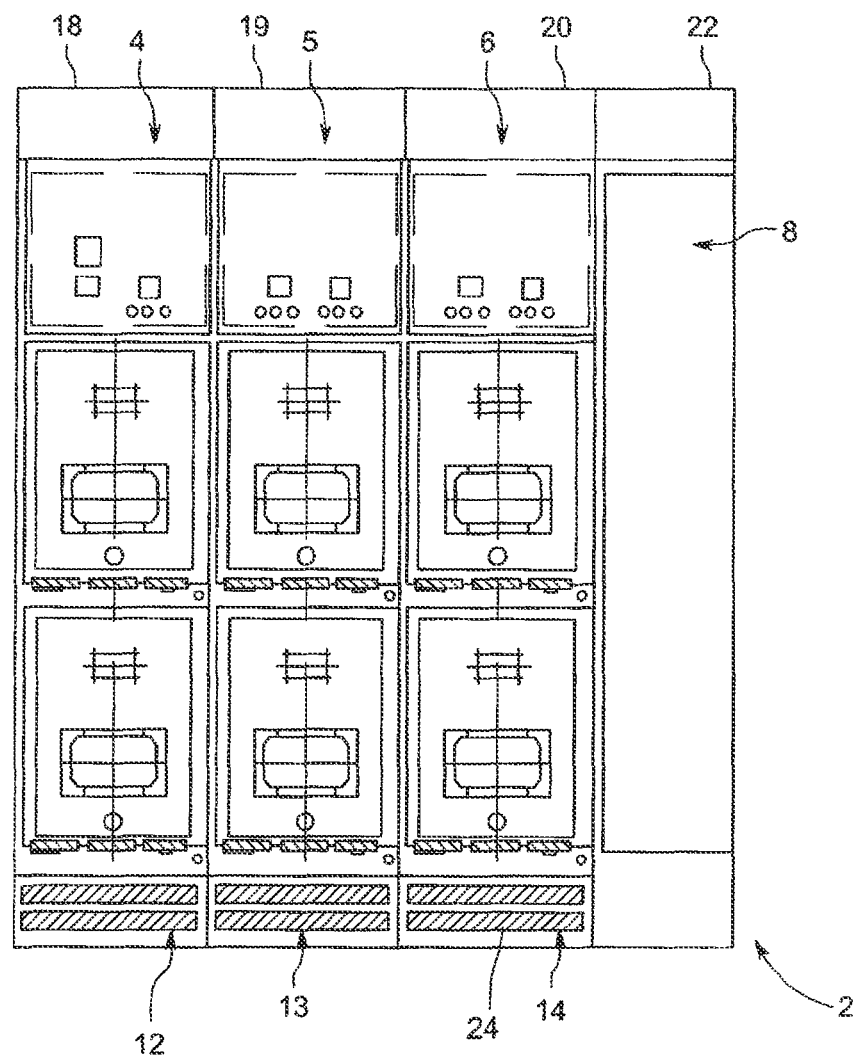
FIG. 1 is a front view of a switchgear housing having a pressure relief member in accordance with an exemplary embodiment.

A switchgear housing in accordance with an exemplary embodiment is indicated generally at 2 in FIG. 1. Switchgear housing 2 includes a plurality of circuit breaker panels indicated generally at 4, 5 and 6, and a side panel 8. Each circuit breaker panel 4, 5 and 6 includes a corresponding inlet 12, 13 and 14, as well as a corresponding outlet 18, 19 and 20. Side panel 8 also includes an associated outlet 22. As will be detailed more fully below, side panel 8 receives exhaust gases created by an arcing condition in one or more of circuit breaker panels 4, 5 and 6. More specifically, each circuit breaker panel 4, 5 and 6 is fluidically connected to side panel 8 through a duct 24. Duct 24 extends laterally across switchgear housing 2 below circuit breaker panels 4, 5 and 6.

Figure 2:
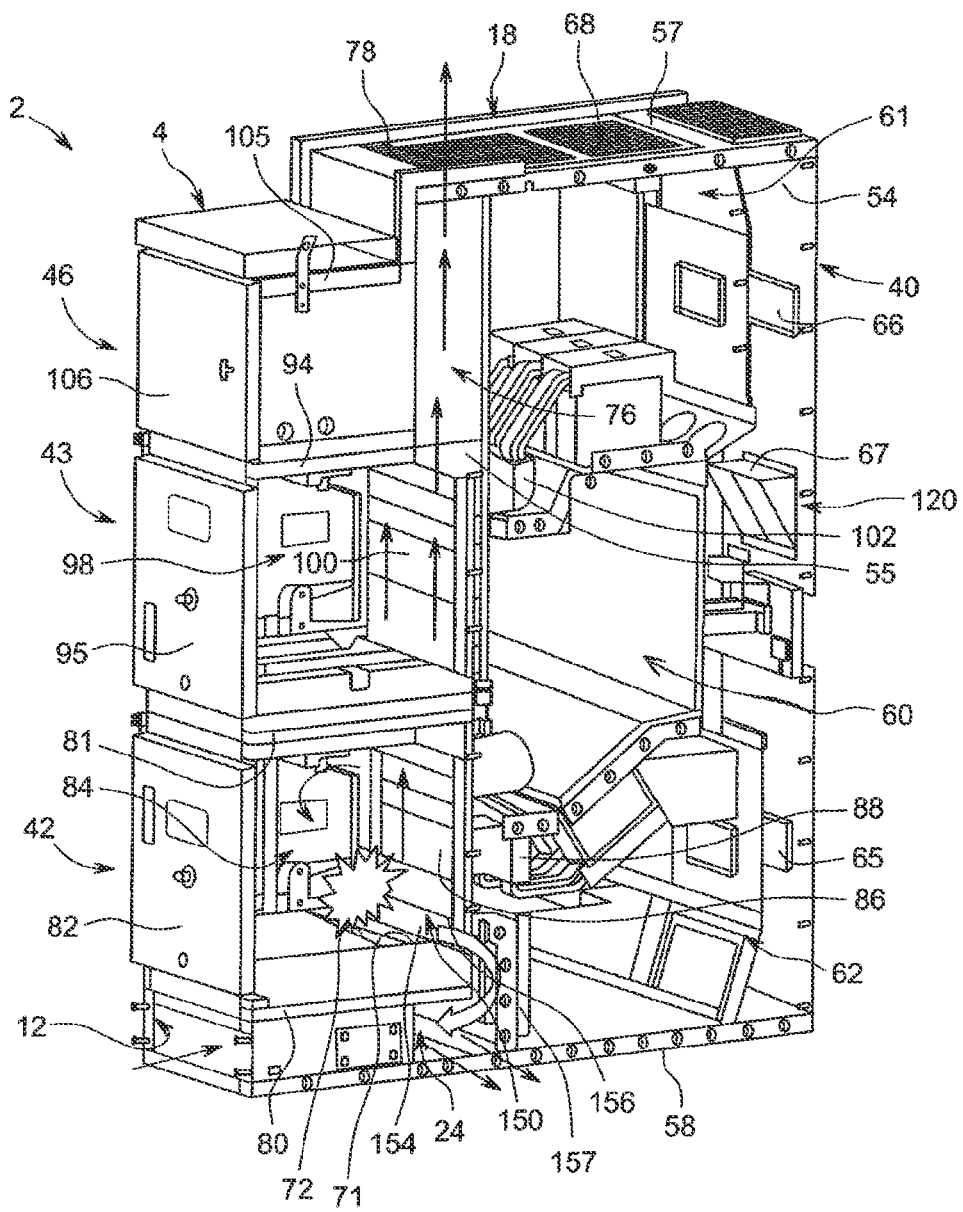
FIG. 2 is a partial cut-away view of the switchgear housing of FIG. 1.

As each circuit breaker panel 4, 5 and 6 is substantially similarly formed, a detailed description will follow with reference to FIG. 2 and circuit breaker panel 4 with an understanding that circuit breaker panels 5 and 6 include corresponding structure. Circuit breaker panel 4 includes a busbar portion 40, a first circuit breaker portion 42, a second circuit breaker portion 43 and an instrument/low voltage compartment portion 46. Busbar portion 40 includes a first side or rear wall 54 and an opposing, second side or partition wall 55. A top or downstream wall 57 extends between first and second side walls 54 and 55 at a first end (not separately labeled) and a bottom or upstream wall 58 extends between first and second side walls 54 and 55 at a second end (also not separately labeled). Busbar portion 40 includes a busbar enclosure 60, a first or upper cable enclosure 61 and a second or bottom cable enclosure 62.

Figure 3:
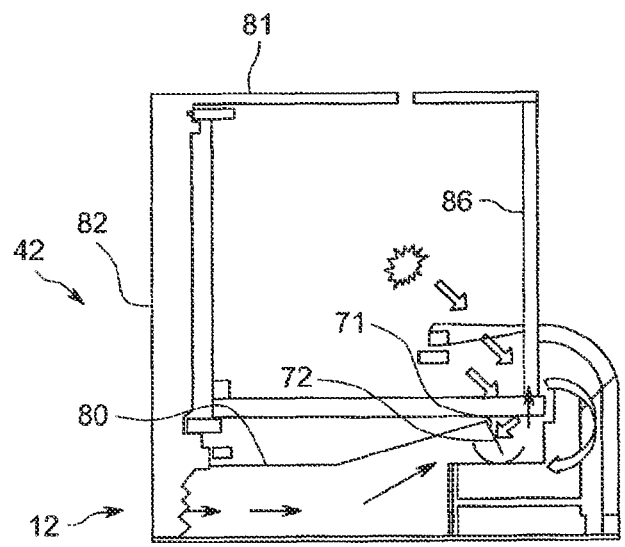
FIG. 3 is a partial cut-away view of a circuit breaker portion of the switchgear housing of FIG. 2 in accordance with an exemplary embodiment.
Figure 4:
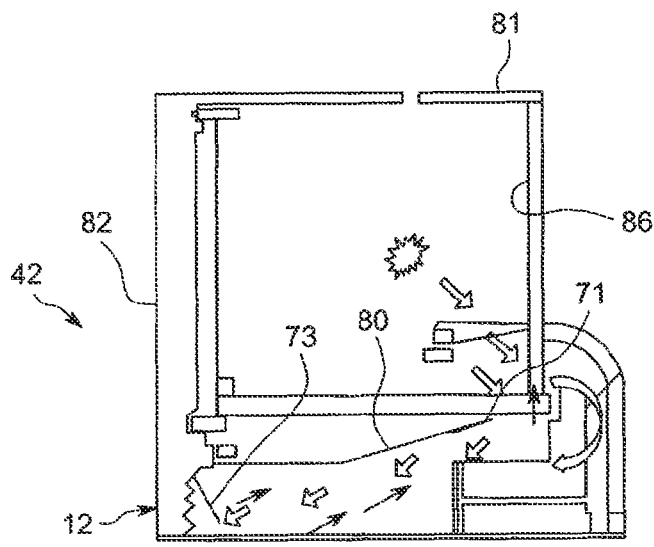
FIG. 4 is a partial cut-away view of a circuit breaker portion of the switchgear housing of FIG. 2 in accordance with another aspect of an exemplary embodiment.

Busbar enclosure 60 houses a plurality of busbars (not separately labeled) that connect to an electrical source. Busbar portion 40 is also shown to include first and second inspection panels 65 and 66 formed in first side wall 54 as well as an inlet 67 and a mesh panel 68 that is provided at outlet 18. Inlet 67 allows cooling air to flow through busbar portion 40, exchanging heat with busbar components, and pass from outlet 18. As shown in FIG. 3, first circuit breaker portion 42 receives a cooling airflow through inlet 12. The cooling air passes through inlet 12 and through an opening 71 provided in first circuit breaker portion 42. The cooling air circulates within first circuit breaker portion 42 providing convection cooling to components contained therein. The cooling air also provides convection cooling for second circuit breaker portion 43. Opening 71 includes a flap 72. Flap 72 closes opening 71 in the event of an arcing condition in first circuit breaker portion 42, as will be detailed more fully below. In accordance with another aspect of the exemplary embodiment illustrated in FIG. 4, in place of a flap across opening 71, a flap 73 may be arranged at inlet 12. In FIG. 2, busbar portion 40 is also shown to include a duct 76 that extends between first side wall 54 and instrument/low voltage compartment portion 46. Duct 76 is fluidically connected between second circuit breaker portion 43 and an outlet 78. Duct 76 carries hot air from second circuit breaker portion 43 to outlet 78. In addition, duct 76 carries gases, and any associated pressure wave associated with an arcing event, from second circuit breaker portion 43 to outlet 78.

First circuit breaker portion 42 includes a first wall member 80 an opposing second wall member 81 and a third wall member 82. First and second wall members 80 and 81 extend substantially perpendicularly from second side wall 55 and are connected by third wall member 82. First, second and third wall members 80-82, together with a portion of second side wall 55, collectively define a first circuit breaker enclosure 84. First circuit breaker enclosure 84 is configured to receive a circuit breaker (not shown). A selectively moveable shutter 86 provides access to a connection passage 88 that is connected to each of the plurality of busbars. More specifically, upon insertion of a circuit breaker into first circuit breaker enclosure 84, panel 86 opens exposing connection passage 88. Conductors extend through connection passage 88 between one or more of the plurality of busbars (not separately labeled) and the circuit breaker. The circuit breaker, in turn, is connected to an electrical load (not shown).

Second circuit breaker portion 43 includes a first wall section 94 and a second wall section 95. First wall section 94 extends substantially perpendicularly from first side wall 54 and is connected to second wall member 81 through second wall section 95. First wall section 94 and second wall section 95, together with second wall member 81 and a portion of first side wall 54, collectively define a second circuit breaker enclosure 98. Second circuit breaker enclosure 98 includes a moveable shutter 100 that selectively exposes a connection passage 102. In a manner similar to that discussed above, connection passage 102 provides a pathway for conductors to extend between, and electrically connect, one or more of the plurality of busbars with a circuit breaker (not shown). Instrument/low voltage compartment portion 46 includes a first wall element 105 and a second wall element 106. First wall element 105 extends substantially perpendicularly from first side wall 54 and is joined to first wall section 94 through second wall element 106. Second wall element 106 may support various instruments and/or meters (not shown) that provide data relating to circuit breakers that may reside in one or more of first and second circuit breaker portions 42 and 43.

Figure 5:
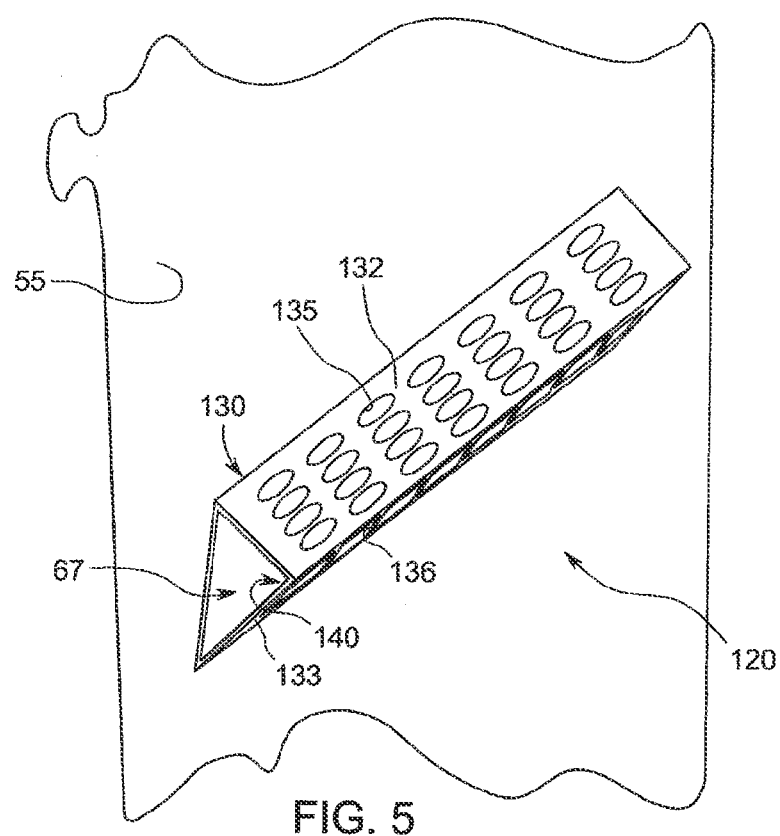
FIG. 5 is a perspective view of a pressure relief member having a pressure relief element shown in an open position in accordance with an exemplary embodiment.
Figure 6:
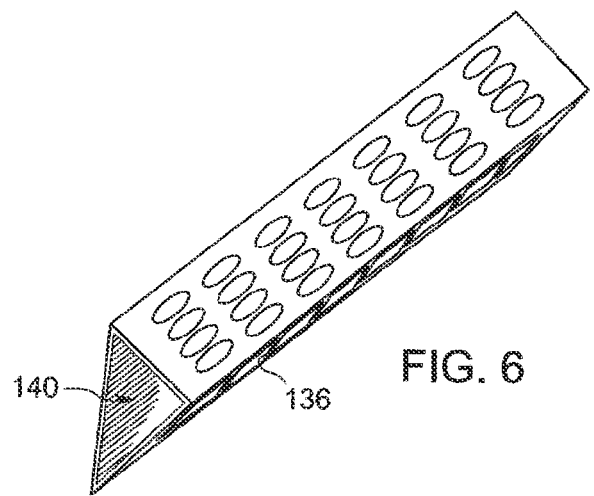
FIG. 6 is a perspective view of the pressure relief member of FIG. 3 illustrating the pressure relief element in a closed position.

In accordance with an exemplary embodiment, busbar portion 40 includes a first pressure relief member 120 provided on second side wall 55 at inlet 67. As shown in FIG. 5, first pressure relief member 120 is normally open and includes a frame 130 having a first frame member 132 and a second frame member 133 formed from, for example, an aluminum-zinc alloy. First and second frame members 132 and 133 extend from second side wall 55 and include a number of openings, two of which are shown at 135 and 136. Frame 130 supports a pressure relief element 140. Pressure relief element 140 is in a normally open position allowing cooling air to enter inlet 67 and is shiftably, pivotally mounted within frame 130. Pressure relief element 140 may be formed from a plastic material, sheet metal or other suitable materials. Pressure relief element 140 pivots to close inlet 67 when exposed to gases created by an arcing event in busbar enclosure 60, first cable enclosure 61 and/or second cable enclosure 62. More specifically, an arcing condition will create gases having an associated pressure wave that expands within busbar enclosure 60, first cable enclosure 61 and/or second cable enclosure 62. Left unchecked, the gases, along with the pressure wave, may escape through inlet 67 and may have a negative impact on adjacent components. In accordance with the exemplary embodiment, once formed, the gases, along with the associated pressure wave, act upon pressure relief element 140 through openings 135 and 136 formed in frame 130. In response, pressure relief element 140 pivots within frame 130 and covers inlet 67.

In accordance with another aspect of the exemplary embodiment, first circuit breaker portion 42 includes a second pressure relief member 150. Second pressure relief member 150 takes the form of a normally closed shutter 154 positioned across an opening 156 formed in first side wall 54 within first circuit breaker enclosure 84. Opening 156 leads to a flow deflector member 157. Flow deflector member 157 leads hot air circulating within first circuit breaker enclosure 84 into duct 24 and from switchgear housing 2, as will be detailed more fully below. In addition to providing a passage for hot air, when exposed, opening 156 guides gases, and any associated pressure wave developed as a result of an arcing condition in first circuit breaker enclosure 84, into duct 24. In the event of an arcing condition, a pressure wave forces normally closed shutter 154 open to expose opening 156. The pressure wave also acts upon flap 72 closing opening 71. The hot air and/or gases and pressure wave are then directed from first circuit breaker enclosure 84, through opening 156, downward over flow deflector member 157, through duct 24 below one or more adjacent switchgear components, and passed to ambient via outlet 22 provided in side panel 8. With this arrangement, the gases and pressure wave are prevented from passing through inlet 12, are directed away from other components within switchgear housing 2 and are guided to a location in which the gases and pressure wave will have little or no impact.

At this point, it should be understood that the exemplary embodiments provide a construction that guides cooling air through a switchgear housing. The construction allows cooling air to flow into a front portion of a circuit breaker portion and through a rear portion of the busbar portion. A portion of the cooling air passing into the circuit breaker portion passes below and through adjacent switchgear components before exiting through an outlet formed in a side panel. In addition, the construction provides pressure relief members that prevent gases and associated pressure waves from exiting the switchgear housing and impacting adjacent structure. The pressure relief members guide the gases and associated pressure waves through outlets that are arranged to reduce any negative impact to neighboring components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A switchgear housing comprising:
   a busbar portion including a busbar enclosure and an inlet formed in an outer side wall of the switchgear housing, the inlet configured to allow cooling air to flow through the busbar portion;
   a first circuit breaker portion including a first circuit breaker enclosure;

a second circuit breaker portion including a second circuit breaker enclosure; and a first pressure relief member arranged across the inlet formed in the outer side wall of the busbar portion, the first pressure relief member being configured and disposed to move to a closed position when gases associated with an arcing event enter the busbar enclosure and guide the gases upward through the busbar portion.

2. The switchgear housing according to claim 1, wherein the busbar portion includes at least one side wall having an inlet, the first pressure relief member includes a normally open pressure relief element pivotally mounted across the inlet.

3. The switchgear housing according to claim 1, wherein the busbar portion includes at least one side wall having an inlet, the first pressure relief member includes a frame mounted at the inlet.

4. The switchgear housing according to claim 3, wherein the frame surrounds the inlet.

5. The switchgear housing according to claim 3, wherein the first pressure relief member includes a normally open pressure relief element moveably mounted within the frame.

6. The switchgear housing according to claim 1, further comprising: a second pressure relief member arranged in the first circuit breaker enclosure.

7. The switchgear housing according to claim 6, further comprising: a duct extending laterally across and below the first circuit breaker enclosure.

8. The switchgear housing according to claim 7, wherein the second pressure relief member comprises a normally closed shutter provided across an opening formed in the first circuit breaker enclosure and fluidically connected to the duct.

9. The switchgear housing according to claim 8, further comprising: an inlet arranged below the first circuit breaker portion and fluidically connected to the duct.

10. The switchgear housing according to claim 1, further comprising: a duct extending between the second circuit breaker enclosure and an upper wall of the busbar portion.

11. A method of relieving pressure generated by an arcing event in a switchgear housing comprising:

arranging a first pressure relief member across an inlet formed in an outer side wall of a busbar portion of the switchgear housing, the inlet configured to allow cooling air to flow through the busbar portion;

moving the first pressure relief member to a closed position to close the inlet to the busbar portion of the switchgear housing in response to gases produced from the arcing event entering the busbar portion; and delivering the gases to an outlet provided in a downstream wall of the switchgear housing.

12. The method of claim 11, wherein moving the first pressure relief member to a closed position includes shifting the first pressure relief member across an opening formed in a rear wall of the busbar portion.

13. The method of claim 12, wherein moving the first pressure relief member to a closed position includes shifting a normally open pressure relief element of the first pressure relief member across the inlet.

14. The method of claim 13, wherein shifting the normally open pressure relief element across the inlet includes moving the first pressure relief element within a frame.

15. The method of claim 12, wherein moving the first pressure relief member to a closed position includes preventing the gases generated by the arcing event from exiting the switchgear housing through the inlet.

16. The method of claim 11, further comprising: exposing an opening formed in a wall of a circuit breaker portion in response to the gases generated by the arcing event in the circuit breaker portion of the switchgear housing.

17. The method of claim 16, wherein exposing the opening includes opening a second pressure relief member and guiding the gases through the opening into a duct extending laterally across the switchgear housing below the circuit breaker portion.

18. The method of claim 17, further comprising: directing the gases into a second duct extending below an adjacent switchgear housing.

19. The method of claim 18, further comprising: directing the gases through an upper portion of the adjacent switchgear housing.

20. The method of claim 17, further comprising: introducing an air flow into the circuit breaker portion through an inlet arranged below the circuit breaker portion.

* * * * *